July 12, 1955  V. W. BEARINGER  2,713,150

MODULATORS

Filed Oct. 1, 1951

INVENTOR.
VAN W. BEARINGER
BY
George H Fisher
ATTORNEY

United States Patent Office 2,713,150
Patented July 12, 1955

2,713,150

MODULATORS

Van W. Bearinger, Minneapolis, Minn., assignor to Minneapolis-Honeywell Regulator Company, Minneapolis, Minn., a corporation of Delaware Application October 1, 1951, Serial No. 249,107

2 Claims. (Cl. 332—51)

The present invention relates to modulators. It has particular application to a small signal direct current modulator, but it need not be limited to this for it may just as successfully be used to modulate an alternating voltage.

It is an object of the present invention to provide an improved modulator using a coiled spring whose electrical resistance varies with a change in the tension of the spring.

A further object of the present invention is to accomplish the modulation of a voltage source without the making and breaking of a set of contacts.

Another object of the present invention is to provide a modulator where a very small amount of motion is required to obtain a large percentage of modulation.

Still another object of the present invention is to provide a modulator in which the modulating element can be hermetically sealed.

It is a further object of the present invention to provide a modulator that inherently is a relatively low impedance device.

These and other objects will be disclosed in the course of the following specification, reference being had to the accompanying drawings wherein.

Figure 1:
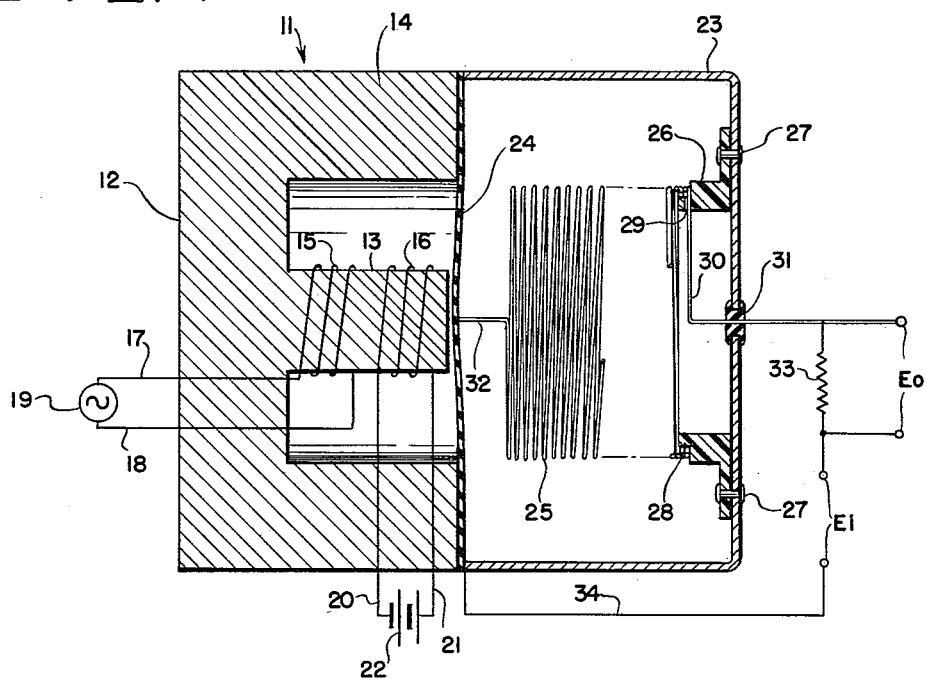
Figure 1 is a diagrammatic sketch of my invention.

Referring to Figure 1, the numeral 11 designates an electromagnet having an easily magnetized core 12 of soft iron or similar material. The cylindrical electromagnet 11 has a center post 13 and a cylindrically formed outer wall 14. The electromagnet is energized by means of two coils 15 and 16 wrapped around the center post 13. Coil 15 is connected by leads 17 and 18 to an alternating voltage source 19, and coil 16 is connected by leads 20 and 21 to a direct voltage source 22. This direct voltage source 22 supplies a biasing voltage upon the electromagnet 11 which will produce a constant magnetic flux. The alternating voltage 19 will produce lines of magnetic flux which will alternately aid and oppose the magnetic flux produced by the direct voltage source. This alternating voltage source 19 will never be of such magnitude that it will overcome the effect of biasing voltage 22 such that the flow of magnetic flux would change direction.

A cylindrical casing 23 holds a circular diaphragm 24, which is magnetically responsive, in position to be operated upon by the electromagnet 11. This casing is connected to the outer wall 14 of the electromagnet in any suitable manner (not shown in the drawing). Diaphragm 24 may be of any type so long as it is magnetically responsive. If it is a flexible metallic type diaphragm it may also serve as a part of an electrical circuit which will be explained later.

Enclosed within the casing 23 is a helical or conical spiral spring 25. This spring is known in the prior art and is wound in such a way that the initial tension varies slightly along its length; and therefore when the spring is loaded, the turns separate in a continuous fashion starting at one end and moving to the other as the loading is increased. Spring 25 is formed of current conducting material. Normally the turns are in contact with one another and the electrical resistance of the spring is at a minimum; but as the turns of the spring consecutively peel off the resistance is increased. Thus, spring 25 is a variable resistance element whose electrical resistance is varied with a change in the tension of the spring. If 25 is a conical spring, as the loading is increased, the larger turns will separate first and then the smaller turns with the effect that the resistance is increased by progressively decreasing increments. In the embodiment of the invention shown in the drawing the spring is formed as a cylindrical helix such that its resistance will vary linearly with a change in the tension of the spring.

A cylindrical bracket 26 formed of dielectric material such as "Bakelite" is secured to the end wall of the casing 23 by means of rivets 27 or in any other suitable manner. The bracket 26 is cut down at 28 and the last few turns of the spring 25 are wound about this portion of the bracket to form a support for the spring. There is a hole 29 in the bracket 26 allowing passage for wire 30 which leads one end of spring 25 out of the casing 23 through a rubber grommet or the like 31. The other end of spring 25 is connected by means of wire 32 to the center of the circular diaphragm 24.

One end of a resistor 33 is connected to the wire 30 and its other end is connected to one side of a voltage source $E_i$. The other side of voltage source $E_i$ is connected by means of conductor 34 to the metallic diaphragm 24. An electrical circuit may now be traced from the source $E_i$ through conductor 34, diaphragm 24, wire 32, spring 25, wire 30, resistor 33, and back to the source $E_i$. The output of this circuit $E_o$ is taken from across the resistor 33.

*Operation*

A principal purpose of the present invention is to effect the modulation of an input voltage $E_i$. How this is accomplished will now be discussed.

The voltage source $E_i$ has been connected in series with a resistor 33 and a spring 25. The output of this circuit is taken from across resistor 33. The operation of spring 25, as previously explained, shows that its resistance is increased when it is expanded. The percentage change in resistance may be hundreds of times greater than the percentage change in length. It has been necessary in the drawing for purposes of illustration to greatly exaggerate the motion of this spring 25. Spring 25 is effectively a variable resistance element; and if $E_i$ is a direct voltage source, we effectively have the series circuit consisting of this voltage source, a variable resistor 25, and a fixed resistor 33. It is known that if the resistance of the variable resistor is increased this will cause a decrease in the current through the circuit and this will consequently cause a decrease in the voltage drop across the fixed resistor. Likewise, a decrease in the resistance of the variable resistor will cause an increase in the current through the circuit and this will consequently cause an increase in the voltage drop across the fixed resistor. If the resistance of the variable resistor is varied at a sine rate, the voltage across the fixed resistor will change accordingly. The output voltage $E_o$ is taken from across this fixed resistor 33. Therefore, it is seen that by changing the resistance of spring 25 at any desired frequency within the limits of the spring, it will effectively modulate the input voltage $E_i$.

The tension in spring 25 and therefore its resistance is changed in the following manner. One end of spring 25 is connected to a magnetically responsive diaphragm 24. The diaphragm is operated upon by an electromagnet 11 as follows: first, a direct voltage 22 applied to the coil 16 wrapped around the center post 13 applies a constant static pull upon the diaphragm 24; and second, alternating voltage 19 applied to the coil 15 and wrapped around the center post 13 will alternately increase and decrease the flux in the electromagnet 11. This alternating voltage source 19 will never be of such magnitude that it will overcome the biasing voltage 22 such that the magnetic flux would change direction. This has the effect that the biasing voltage 22 will first expand the spring to a mean value and the alternating voltage will cause the spring to be variably expanded. It will first increase the expansion over the mean value and then it will be decreased in a like amount. The displacement of the diaphragm 24 and the spring 25 will be at the same frequency as that of the alternating voltage 19. Since the resistance of the variable resistance spring 25 is a function of its displacement, its resistance will vary at the same frequency as that of the alternating voltage 19. As previously explained, this varying of the resistance of the variable resistance spring causes the modulation of the input voltage $E_1$; and the modulated output $E_o$ will be of the same frequency as the alternating voltage 19.

Figure 2:
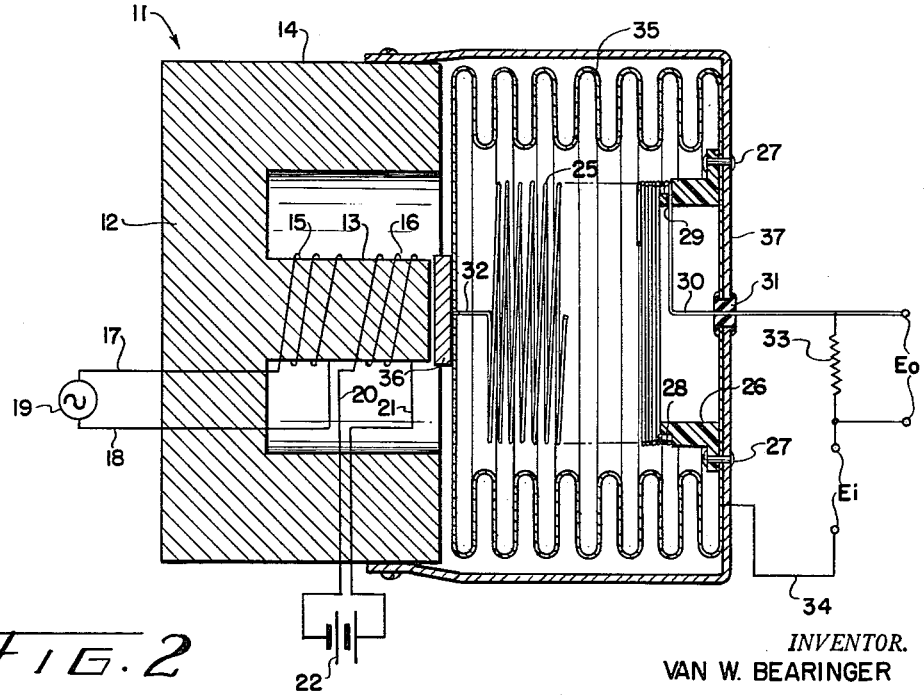
Figure 2 is a modification of the invention showing the variable resistance spring enclosed in a bellows.

*Modification of Figure 2*

In this form of the invention, a cylindrical metal bellows 35 encloses spring 25. The bellows may be filled with an inert gas and by this means the spring is hermetically sealed for dust-free operation. A circular metal disc 36 attached to the bellows acts as an armature to be operated upon by the electromagnet 11. A metal frame 37 attached to the electromagnet in any suitable manner supports the bellows 35 in operating position. The bellows 35 is connected to the metal frame 37 by means of rivets 27 or in any other suitable manner. In this modification, conductor 34 is connected directly to the metallic bellows 35, and the bellows will act as a conductor to the wire 32.

The operation of this modulator will be accomplished like that described in the explanation of the operation of Figure 1. Coil 16 wrapped around the center post 13 of the electromagnet 11 is connected to a direct voltage source 22. This biasing voltage 22 applies a constant static pull upon the armature disc 36 which loads the spring 25. The alternating voltage 19 will cause alternately an expansion and compression of the bellows 35 which varies the expansion of the spring 25. As explained previously, this variation in the expansion of spring 25 causes a corresponding change in the resistance of spring 25. This change in the resistance in the circuit comprising the input voltage $E_1$, conductor 34, metal bellows 35, wire 32, spring 25, wire 30, and resistor 33, effectively modulates the input voltage $E_1$ as previously explained. The modulated output $E_o$ is taken from across the resistor 33 and will be modulated at the frequency of the alternating voltage source 19.

It will be obvious to those skilled in the art that my invention may be modified by many substitutions and equivalents and that this disclosure is intended to be illustrative only. I intend to be limited solely by the scope of the appended claims.

I claim as my invention:

1. Modulator apparatus comprising in combination: an electromagnet constructed of easily magnetizable material having an electrical winding thereon energized by a source of direct current potential of relatively large magnitude for producing a constant magnetic flux in said electromagnet; a second electrical winding on said electromagnet energized by a source of alternating potential of relatively small magnitude to vary the magnetic flux in said electromagnet; magnetically responsive armature means operated on by said electromagnet; a current conducting coiled spring having its initial tension varying slightly along its length so that its turns separate one at a time in a continuous manner starting at one end and moving to the other such that the electrical resistance of said spring varies with a change in its tension; a resistor; a voltage source; electrical circuit means comprising said source, and resistor, and said coiled spring being connected in series; metallic bellows completely enclosing said spring in a hermetically sealed manner, said bellows being filled with an inert gas, said armature means connected to one wall of said bellows and means supporting said spring from opposite walls of said bellows so that the movement of said armature means in response to the varying flux of said electromagnet effects a change in the resistance of said spring.

2. Modulator apparatus comprising in combination: an electromagnet having inner and outer concentric poles constructed of easily magnetizable material and having a first electrical winding on the inner pole of said electromagnet energized from a source of direct current potential of relatively large magnitude and producing a constant magnetic flux in said electromagnet; a second electrical winding on the inner pole of said electromagnet energized from a source of alternating potential of relatively small magnitude to vary the magnetic flux in said electromagnet; said outer pole enclosing said windings and forming a partial casing for said apparatus, magnetically responsive armature means operated on by said electromagnet; a current conducting coiled spring having its initial tension varying slightly along its length so that its turns separate one at a time in a continuous manner starting at one end and moving to the other such that the electrical resistance of said spring varies with a change in its tension; a resistor; a voltage source; electrical circuit means comprising said source, said resistor, and said spring being connected in series; metallic bellows completely enclosing said spring in a hermetically sealed manner, said bellows being filled with an inert gas, said armature means connected to one wall of said bellows; and means supporting said spring from opposite walls of said bellows so that the movement of said armature means in response to the varying flux effects a change in the resistance of said spring.

References Cited in the file of this patent

UNITED STATES PATENTS

| | | |
|---|---|---|
| 1,677,190 | Loynes | July 17, 1928 |
| 2,484,030 | Hastings et al. | Oct. 11, 1949 |
| 2,555,770 | Stockinger | June 5, 1951 |
| 2,564,416 | Wildhack | Aug. 14, 1951 |
| 2,586,393 | Smith et al. | Feb. 19, 1952 |

OTHER REFERENCES

"Variable-Resistance Spring," Electrical Engineering, October 1948, page 966.